United States Patent [19]

Semler et al.

[11] Patent Number: 4,999,491
[45] Date of Patent: Mar. 12, 1991

[54] OPTICAL SEEKER WITH ROSETTE SCANNING

[75] Inventors: Gerd Semler, Frickingen-Altheim; Gerd Wilhelm, Uhldingen-Mühlofen, both of Fed. Rep. of Germany

[73] Assignee: Bodenseewerk Gerätetchnik GmbH, Bodensee, Fed. Rep. of Germany

[21] Appl. No.: 81,814

[22] Filed: Jul. 9, 1987

[30] Foreign Application Priority Data

Jul. 11, 1986 [DE] Fed. Rep. of Germany ....... 3623343

[51] Int. Cl.⁵ .......................... G01V 1/20; G02B 27/17
[52] U.S. Cl. .................................... 250/236; 250/233; 350/6.3; 350/6.9
[58] Field of Search ................. 250/233, 236; 350/6.3, 350/6.9

[56] References Cited

U.S. PATENT DOCUMENTS

| 4,009,393 | 2/1977 | Ashley et al. | 250/236 |
| 4,030,807 | 6/1977 | Briney | 250/233 |
| 4,039,246 | 8/1977 | Voigt | 350/7 |
| 4,329,579 | 5/1982 | Jansen et al. | 250/233 |
| 4,413,177 | 11/1983 | Godwin et al. | 250/236 |
| 4,427,878 | 1/1984 | Buchtel et al. | 350/6.9 |
| 4,639,589 | 1/1987 | Weber et al. | 350/6.3 |
| 4,717,823 | 1/1988 | Stermel et al. | 250/236 |

Primary Examiner—Nelson Moskowitz
Attorney, Agent, or Firm—Fleit, Jacobson, Cohn, Price, Holman & Stern

[57] ABSTRACT

An optical seeker comprises a rotor (16) mounted on a bearing sleeve (42) to pivot about a pivot point (26) and to rotate about an axis of rotation (28). The rotor (16) carries an imaging system having a concave mirror (50) and a secondary mirror (52). The optical axis of concave mirror (50) and secondary mirror (52) form an angle with the axis of rotation (28). A sunshade (54) is connected to the rotor (16). The bearing sleeve (42) carries an optical element (56). An axle portion (58) is provided on the element (56), on which axle portion the secondary mirror (52) is mounted. The secondary mirror (52) is connected to the sunshade (54) through a stepping-up planetary gear having internal toothing (72), planet wheel (76) and external toothing (78). The planet wheel (76) is mounted on a carrier (74) connected with the axle portion (58).

1 Claim, 1 Drawing Sheet

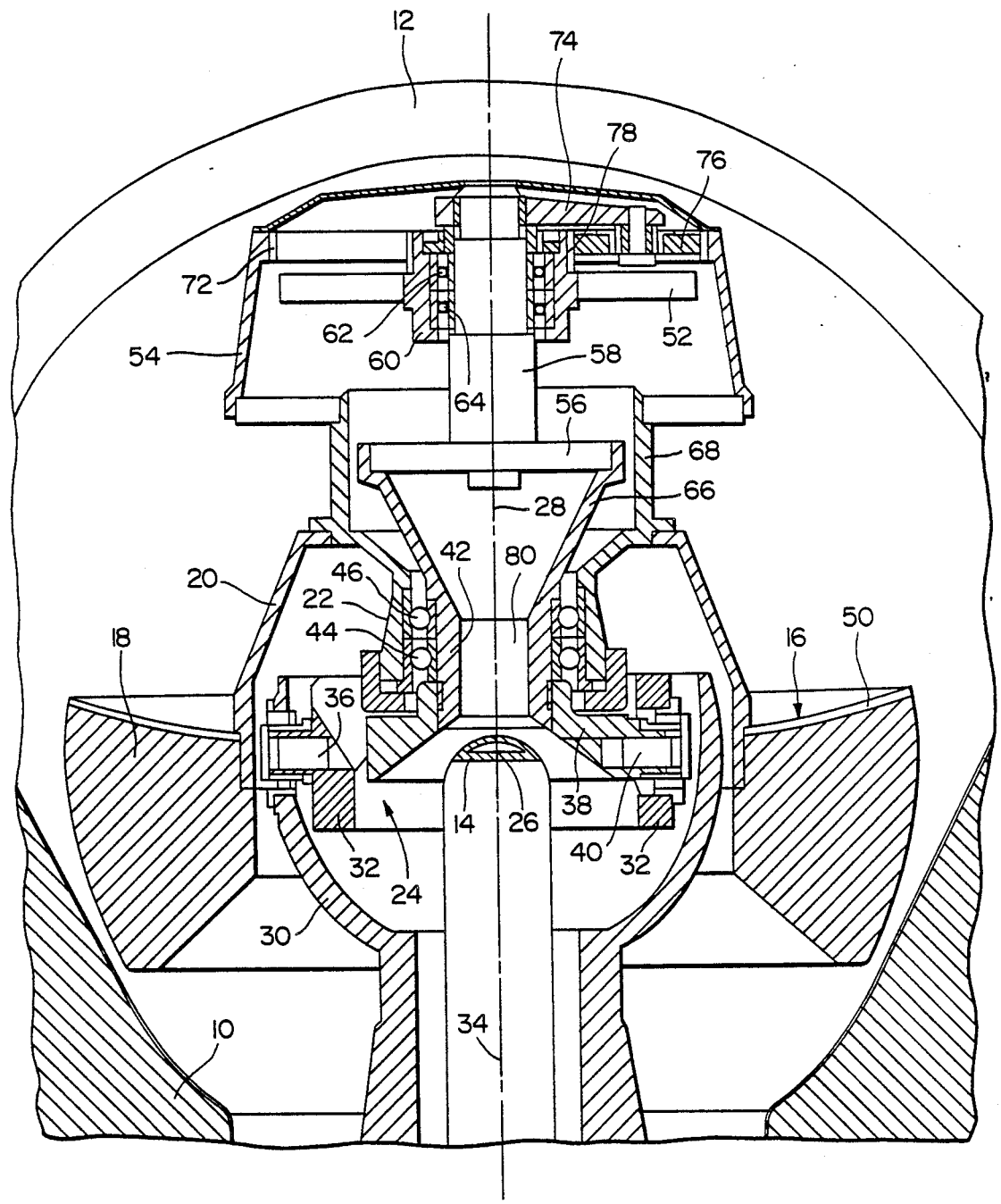

OPTICAL SEEKER WITH ROSETTE SCANNING

The invention relates to an optical seeker with rosette scanning, adapted to scan a field of view along a rosette type path, comprising
(a) a rotor having an outer rotor ring, a bell shaped intermediate portion communicating therewith and extending in the direction of the field of view, and a hub portion held coaxially in the intermediate portion,
(b) a gimbal mounting for the rotor, comprising an outer mounting body stationary with respect to the housing, in which body a first gimbal is pivotably mounted about a first gimbal axis extending perpendicularly to a first longitudinal seeker axis, and a second gimbal pivotably mounted in the first gimbal about a second gimbal axis perpendicularly to the first gimbal axis and which second gimbal has a cylindrical bearing sleeve through which the rotor is rotatably mounted about an axis of rotation perpendicular to the second gimbal axis,
(c) a detector stationary with respect to the housing,
(d) an optical system which is of the type of a Cassegrain system and by which the field of view is imaged in the plane of the detector as field of view image, having
  ($d_1$) an annular concave mirror arranged on the rotor ring and facing the field of view, as primary mirror,
  ($d_2$) a secondary mirror facing the concave mirror and the detector, the normal of which secondary mirror forms an angle with the axis of rotation of the rotor for generating a first gyrating motion of the field of view image relative to the detector, and
  ($d_3$) a sunshade arranged on the side of the field of view of the secondary mirror and extending around the secondary mirror, and
  ($d_4$) an annular transparent element arranged between the secondary mirror and the detector and traversed by the imaging path of rays, which element carries a central axle portion extending through the secondary mirror, and
  ($d_5$) means for generating a second gyrating motion of the field of view image relative to the detector, and
(e) a transmission through which the secondary mirror is connected to the means for generating the second gyrating motion, such that each point of the field of view image makes a rosette type motion relative to the detector.

Such an optical seeker is subject matter of the EP-OS 79 684 discussed hereinbelow.

Optical seekers of this type are used in particular in target seeking missiles, for example air-to-air rockets. A field of view is scanned along a rosette shaped path. The deviation of a target from the axis of the seeker, that is the rotor axis, is determined from the signals obtained therewith. The deviation signals thus obtained are used to align the rotor and its rotor axis with the target. The rotating rotor forms a gyro movable with two degrees of freedom with respect to the missile, the orientation of which in the space is not influenced by the motions of the missile. The function of the seeker is thus decoupled from the motions of the missile.

The rosette shaped scanning path results form the superposition of two gyrating scanning motions of different rotary speeds and opposite senses of rotation.

Various seekers having a rosette shaped scanning path are known.

U.S. Pat. No. 4,009,393 shows a seeker having a rosette shaped scanning path, wherein the imaging optical system is formed by a lens arranged on the rotor. The optical axis of the lens extends excentrically to the axis of rotation of the rotor. A gyrating scanning motion with the rotary speed of the rotor is thus generated. The rotor is driven through a stator winding. A second gyrating scanning motion is generated by a prism located in the path of rays on a sleeve rotatable about a longitudinal axis and surrounding the detector. This sleeve is driven by a separate motor independently of the rotor.

U.S. Pat. No. 4,030,807 shows a seeker wherein the imaging system arranged on the rotor is a Cassegrain system having a primary mirror formed as annular concave mirror and facing the field of view, and a slightly convex secondary mirror facing the primary mirror. The rotor is gimbal suspended to pivot about a central point. The imaging system generates an image of the field of view in the area of this central point. One of the mirrors is slightly tilted with respect to the rotor axis, whereby a gyrating scanning motion with the rotary speed of the rotor is obtained. The field of view image thus obtained is imaged in the plane of a detector by an objective stationary with respect to the missile via a plane mirror. The plane mirror is located on the end face of the shaft of a motor and is also slightly tilted with repect to the axis of rotation of this shaft. Thereby the second gyrating scanning motion is generated, which motion has a rotary speed different from the rotory speed of the rotor.

U.S. Pat. No. 4,039,246 shows a seeker wherein the imaging system is also a Cassegrain system having an annular concave mirror as primary mirror and a plane mirror facing the primary mirror as secondary mirror. The optical axis of the primary mirror forms a small angle with the rotor axis. This results in a gyrating scanning motion with the rotary speed of the rotor. Furthermore, the secondary mirror is slightly tilted and rotatably mounted with respect to the rotor. The secondary mirror is driven by a separate motor having a rotary speed different from the rotory speed of the rotor. This results in the second superimposed gyrating scanning motion such that all together the field of view is scanned along a rosette shaped path.

U.S. Pat. No. 4,413,177 describes a seeker having a Cassegrain system, wherein the two gyrating scanning motions are generated by means of a single driving motor, namely the drive of the rotor. Also herein the optical axis of the primary mirror is tilted with respect to the axis of rotation, whereby the first gyrating scanning motion is generated. The second gyrating scanning motion is obtained, as in U.S. Pat. No. 4,039,246 discussed hereinbefore, by tilting the secondary mirror. The secondary mirror is, however, driven by the rotating rotor through a friction gear which is of the type of a planetary gear. The rotor is rotatably mounted about the rotor axis on an inner gimbal of a gimbal mounting arrangement. A window or a lens is rotatably mounted with its mounting in the inner gimbal. The secondary mirror is attached to the window by a central pin. The inner gimbal forms a cage for balls which frictionally engage the rotor as well as the mounting of the window. The rotor then acts as the ring gear of a planetary gear, the mounting acts as sun gear and the balls assume the function of the planet wheels. Thus rotary speed step-up transmission is effected. The secondary mirror runs faster than the rotor.

From EP-OS 79,684 an optical seeker for target seeking missiles is known, in which a field of view is scanned along a rosette shaped path. The seeker comprises an optical imaging system which is of the type of a Cassegrain system having an annular concave mirror as primary mirror and a plane mirror as secondary mirror opposite thereto. The optical system is located on a rotor which rotates about its figure axis and is pivotable with its figure axis about a central point in two degrees of freedom by means of a gimbal mounting. The field of view is imaged in a first image plane through the concave mirror and the plane mirror, as well as through another annular mirror opposite the plane mirror, and a further plane mirror. The first image plane is imaged through a lens system in a second image plane in which the detector is located. The detector is arranged stationary with respect to the housing in the central point. The lens system comprises a first and a second lens both optical axes of which coincide with the rotor axis. The path of rays is collimated between the two lenses. Said further annular mirror is located on mounting receiving the first and the second lenses. The rotor is rotatably mounted on the mounting about its figure axis. The lens system is thus always aligned with the figure axis of the rotor, when the rotor is pivoted. The mounting is connected with the rotor through a planetary gear.

The planetary gear is similarly constructed as it is described hereinbefore in connection with U.S. Pat. No. 4,413, 177. Thereby the mounting of the lens system with the annular mirror makes a quicker rotary movement as compared to the rotor opposite to the direction of rotation of the rotor. The secondary mirror of the Cassegrain system is slightly tilted with respect to the rotor axis about which the rotor rotates. This results in a gyrating scanning motion with the rotary speed of the rotor. Also the annular mirror on the mounting of the lens system is slightly tilted with respect to the rotor axis. This provides a gyrating scanning motion of higher rotary speed superposed to the first scanning motion. By the two mirrors each point of the field of view image is caused to describe a rosette shaped path relative to the detector.

In the seekers according to U.S. Pat. No. 4,009,393; U.S. Pat. No. 4,030,807 and U.S. Pat. No. 3,039,246 separate drives are provided for the two gyrating scanning motions to superpose. This presents design problems. In the U.S. Pat. No. 4,039,246, for example, a current supply to the driving motor for the secondary mirror is required, this driving motor being located on the inner gimbal of the gimbal mounting. Space is required for the drives. Finally problems result with regard to the sychonization of the two scanning motions and the observation of the exact rotary speed ratio such that a clear and well defined rosette is scanned.

The seeker according to EP-OS 76 684 is complex in construction. The imaging optical system comprises in addition to the primary mirror, namely the annular concave mirror, and to the secondary mirror, namely the plane mirror, two additional mirrors, the annular mirror and the plane mirror opposite thereto. This increases the expenditure. The additional mirrors which are rotatable relative to each other, may cause angular errors due to play and tolerances. It has to be noted that angular errors double with each reflection. Such angular errors result in modification of the scanned rosette and the thus in errors in associating the signals obtained at the detector with the image points of the field of view.

It is the object of the invention to simplify, in an optical seeker of the above defined type, the mechanism for the rosette scanning.

According to the invention this object is achieved in that (f) as means for generating the second gyrating motion the optical axis of the concave mirror forms an angle with the axis of rotation, (g) the hub portion of the rotor is mounted with its inner face through bearings on the bearing sleeve of the second gimbal, (h) the bearing sleeve flares out funnel-shaped on the side of the field of view and carries the annular transparent element, (i) the sunshade is connected to the rotor through retaining means permitting the passage of the imaging path of rays, (j) the secondary mirror is rotatably mounted on the axle portion, and (k) the gearing is a planetary gear having an inner toothing fixed to the sunshade, an outer toothing connected to the secondary mirror, and at least one planet wheel mounted on a carrier affixed to the axle portion.

An embodiment of an optical seeker is described hereinbelow with reference to the accompanying drawing which shows a longitudinal sectional view of the optical seeker, which is taken, in the left half, along a longitudinal plane comprising a first gimbal axis, and which is taken, in the right half, along a longitudinal plane perpendicular to the first longitudinal plane and comprising a second gimbal axis.

A housing 10 is closed by a transparent dome 12. A detector 14 is arranged stationary with respect to the housing in the housing 10.

A rotor 16 comprising an outer rotor ring 18, a bell shaped intermediate portion 20 communicating therewith and extending in the direction of the field of view, that is upwards in the Figure, and a hub portion 22 held coaxially within the intermediate portion 20. The rotor 16 is mounted to pivote about a pivot point 26 by means of a gimbal mounting 24 and to rotate about an axis of rotation 28.

The gimbal mounting 24 comprises an outer mounting body 30 stationary with respect to the housing. In the mounting body 30 a first gimbal 32 is pivotably mounted about a first gimbal axis 36 extending perpendicularly to a first longitudinal seeker axis 36. A second gimbal 38 is pivotably mounted in the first gimbal 32 about a second gimbal axis 40 perpendicularly to the first gimbal axis 36.

The second gimbal 38 has a cylindrical bearing sleeve 42 through which the rotor 16 is rotatably mounted about the axis of rotation 28 perpendicular to the second gimbal axis 40. To this end the hub portion 22 of the rotor 16 is mounted with its inner face on the exterior of the bearing sleeve 42 through ball bearings 44,46.

By an imaging optical system an image of a field of view which is beyond the dome 12 normally at infinity is imaged as field of view image in the plane of the detector 14. This imaging optical system is of the type of a Cassegrain system and comprises a concave mirror 50 arranged on the rotor ring 18 and facing the field of view, as primary mirror. The optical axis of the concave mirror 50 forms an angle with the axis of rotation 28.

Furthermore, the opical system comprises a secondary mirror 52 facing the concave mirror 50. The normal of the secondary mirror 52 also forms an angle with the axis of rotation 28 of the rotor 16. A sunshade 54 is arranged in conventional manner on the side of the field of view of the secondary mirror 52. This sunshade 54 extends around the secondary mirror 52.

A transparent annular element 56 is arranged between the secondary mirror and the detector 14. Herein this transparent element 56 is a correction lens forming part of the imaging optical system and correcting image errors which are caused by the dome 12. The transparent element 56 carries a central axle portion 58 passing through the secondary mirror 52. A mirror hub 60 is rotatably mounted on the axle portion 58 through ball bearing 62, 64. The mirror hub 60 is thus rotatable about the axis of rotation 28. The secondary mirror 52, which, as already mentioned, forms an angle with the axis of rotation 28, is located on the mirror hub 60.

The bearing sleeve 42 forms a funnel-shaped enlargement 66 on the side of the field of view. This enlargement 66 is closed at its wide end by the annular transparent element 56 and carries this element.

The sunshade 54 is connected to the rotor 16 through retaining means permitting the passage of the imaging path of rays. To this end the rotor 16 has a cylindrical collar 68 between the intermediate portion 20 and the hub portion 22, which cylindrical collar is coaxial to the axis of rotation 28. The collar 68 extends around enlargement 66 and the transparent element 56. An annular transparent glass plate 70 is arranged between the upper edge of the collar 68 and the lower edge of the sunshade 54. The sunshade 54 is thus fixedly connected to the rotor 16 and rotates therewith. Instead of through an annular thansparent glass plate, the connection may also be established in a different manner, for example by an annular disc of opague material having sufficiently large apertures for the passage of the imaging path of rays.

An internal toothing 72 is provided on the sunshade 54. A carrier 74 is affixed to the axle portion 58. A planet wheel 76 is rotatably mounted at the carrier. The planet wheel 76, on one hand, meshes with the internal toothing 75 and, on the other hand, meshes with the external toothing 78 of the mirror hub 60. The internal toothing 72, the planet wheel 76 and the external toothing 78 form a planetary gear which is spatially arranged between the secondary mirror 52 and the sunshade 54 and constitutes a stepping-up driving connection between the sunshade 54 and the mirror hub 60 and thus with the mirror 52.

In the present embodiment the bearing sleeve 42 serves, at the same time, as mounting for an optically effectively glass body 80 arranged in the path of rays.

The described arrangement operates as follows:

The mounting body 30 is stationary and housing fixed. The bearing sleeve 42 with the enlargement 66, the transparent element 56 and the axle portion 58 is universally pivotable about the pivot point 26 through the gimbal mounting 24 but also non-rotating. It determines, however, the axis of rotation 28. The rotor 16 rotates about the axis of rotation 28 with a rotor rotary speed. With the rotor 16 also the sunshade 54 rotates about the axis of rotation 28. The sunshade 54 is taken along through the collar 68 and the glass plate 70. Thus the inner parts 66, 56 and 58 are stationary and the outer parts 20, 22, 68, 70 and 54 rotate thereabout. The planet wheel 76, which is mounted in the stationary carrier 74, is driven by the internal toothing 72 of the sunshade 54. As the diameter of the planet wheel 76 is smaller than the diameter of the internal toothing 72, a stepping-up transmission of the rotary motion is effected while maintaining the sense of rotation. The rotary motion of the planet whell 76 is transmitted to the mirror hub 60 through the external toothing 78, inverting the sense of rotation. Thus the secondary mirror 52 inclined with its surface normal with respect to the axis of rotation 28, runs opposite to the rotation of the rotor 16 and thus of the concave mirror serving as primary mirror, with a rotary speed increased as compared to the rotary speed of the rotor 16. The secondary mirror 52 causes a first gyrating motion of the field of view image relative to the stationary detector 14. A second superposed gyrating motion of this field of view image is obtained in that the optical axis of the concave mirror 50 is slightly inclined with respect to the axis of rotation. A rosette shaped scanning motion results as resultant from the two gyrating motions in opposite directions and at different rotary speeds. The rosette is scanned quickly as the rotory speed of the rotor is stepped-up, the rotory speed of the rotor being already the slower one of the two appearing rotary speeds.

From the signals thus obtained with the rosette scanning, a deviation signal can be obtained in known manner which therefore is not described herein, this deviation signal corresponding to the deviation of a target detected in the field of view, from the axis of rotation 28. In accordance with this deviation signal, torques may be exerted onto the rotor 16 such that the rotary axis 28 is kept in alignment with the target. This is known prior art which is not subject matter of the present invention and therefore is not described in further detail.

We claim:

1. Optical seeker with rosette scanning, adapted to scan a field of view along a rosette type path, comprising
   (a) a rotor (16) having an outer rotor ring (18), a bell shaped intermediate portion (20) communicating therewith and extending in the direction of the field of view, and a hub portion (22) held coaxially in the intermediate portion (20),
   (b) a gimbal mounting (24) for the rotor (16), comprising an outer mounting body (30) stationary with respect to the housing, in which body a first gimbal (32) is pivotably mounted about a first gimbal axis (36) extending perpendicularly to a first longitudinal seeker is axis (34), and a second gimbal (38) pivotably mounted in the first gimbal (32) about a second gimbal axis (40) perpendicularly to the first gimbal axis (36) and which second gimbal has a cylindrical bearing sleeve (42) through which the rotor (16) is rotatably mounted about an axis of rotation (28) perpendicularly to the second gimbal axis (40),
   (c) a detector (14) stationary with respect to the housing,
   (d) an optical system which is of the type of a Cassegrain system and by which the field of view is imaged in the plane of the detector (14) as field of view image, having
      ($d_1$) and annular concave mirror (50) arranged on the rotor ring (18) and facing the field of view, as primary mirror,
      ($d_2$) a secondary mirror (52) facing the concave mirror (50) and the detector (14), the normal of which secondary mirror forms an angle ($\alpha$) with the axis of rotation (28) of the rotor (16) for generating a first gyrating motion of the field of view image relative to the detector, and (d₃) a sunshade (54) arranged on the side of the field of view of the secondary mirror (52) and extending about the secondary mirror (52), and (d₄) a transparent annular element (56) arranged between the secondary mirror (52) and the detector (14) and transversed by the imaging path of rays which element carries a central axle portion (58) passing through the secondary mirror (52), and (d₅) means for generating a second gyrating motion of the field of view image relative to the detector (14), and (e) a transmission through which the secondary mirror (52) is connected to the means for generating the secondary gyrating motion, such that each point of the field of view image makes a rosette type motion relative to the detector (14), characterized in that (f) as means for generating the second gyrating motion the optical axis of the concave mirror (50) forms an angle (α) with the axis of rotation (28), (g) the hub portion (22) of the rotor (16) is mounted with its inner face through bearings (44,46) on the bearing sleeve (42) of the second gimbal (38), (h) the bearing sleeve (42) flares out funnel-shaped (66) on the side of the field of view and carries the transparent annular element (56), (i) the sunshade (54) is connected to the rotor (16) through retaining means (70) permitting the passage of the imaging path of rays, (j) the secondary mirror (52) is rotatably mounted on the axle portion (58), and (k) the gearing is a planetary gear having an internal toothing (72) fixed to the sunshade (54), an external toothing (78) connected to the secondary mirror (52), and at least one planet wheel (76) mounted on a carrier (74) affixed to the axle portion (58).

* * * * *